United States Patent [19]

Kawai

[11] Patent Number: 4,492,455
[45] Date of Patent: Jan. 8, 1985

[54] IMAGE SCANNING SYSTEM HAVING A CONTINUOUSLY ROTATING SUB-SCANNING DRUM

[75] Inventor: Yasuhiro Kawai, Minami-ashigara, Japan

[73] Assignee: Fuji Photo Film Co., Ltd., Japan

[21] Appl. No.: 395,320

[22] Filed: Jul. 6, 1982

[30] Foreign Application Priority Data

Jul. 6, 1981 [JP] Japan ................. 56-105255

[51] Int. Cl.³ .................. G03G 15/00; H04N 1/22
[52] U.S. Cl. ................... 355/3 R; 355/14 SH; 271/246; 358/285; 346/76 L
[58] Field of Search ............ 355/3 R, 8, 16, 72, 355/3 SH, 14 SH; 346/76 L, 108, 125, 134, 110; 271/111, 246, 265, 274, 275; 358/285, 286, 291

[56] References Cited

U.S. PATENT DOCUMENTS

| | | | |
|---|---|---|---|
| 3,368,701 | 2/1968 | Copping et al. | 271/265 X |
| 4,067,021 | 1/1978 | Baylis et al. | 346/76 L |
| 4,146,326 | 3/1979 | Taylor et al. | 355/3 SH |
| 4,326,222 | 4/1982 | Connin et al. | 358/291 X |

Primary Examiner—Arthur C. Prescott
Assistant Examiner—J. Pendegrass
Attorney, Agent, or Firm—Gerald J. Ferguson, Jr.; Joseph J. Baker

[57] ABSTRACT

In an image scanning system the main scanning is carried out by deflecting a scanning light beam across a recording sheet material and the sub-scanning is carried out by moving the recording sheet material in the direction perpendicular to the main scanning direction. The system includes a sub-scanning drum adapted to be continuously rotated to feed the recording sheet material in the sub-scanning direction which is perpendicular to the rotational axis of the drum, a main scanning system for scanning a light beam across the recording sheet material in the direction of the rotational axis of the sub-scanning drum, a pair of nip rolls movable between a first position in which they are pressed against the drum and a second position in which they are removed therefrom, a stopper which is disposed downstream the drum and the nip rolls with respect to the feeding path of the sheet material and is movable into and away from the feeding path, and a sheet discharging means. The recording sheet material is fed toward the stopper which is in the feeding path and is supported thereon in the unstrained state. Then the nip rolls are pressed against the rotating drum sandwiching the recording sheet material therebetween and at the same time the stopper is retracted away from the sheet, whereby the sheet is moved in the sub-scanning direction. The sheet discharging means is arranged not to act on the sheet while the scanning is effected.

4 Claims, 3 Drawing Figures

IMAGE SCANNING SYSTEM HAVING A CONTINUOUSLY ROTATING SUB-SCANNING DRUM

BACKGROUND OF THE INVENTION

1. Field of the Invention

This invention relates to an image scanning system for two-dimensionally scanning a light beam along a recording sheet material, and more particularly to an improvement in a sub-scanning mechanism of an image scanning system in which the main scanning is conducted using a light deflector and the sub-scanning is accomplished by mechanically moving a recording sheet material.

2. Description of the Prior Art

For recording an image or reading out a recorded image as for example in facsimiles, there has been in wide use an image scanning system in which a light beam is one-dimensionally deflected by a deflector to form a scanning line on a recording sheet material (main scanning) and the recording sheet material is moved in a direction perpendicular to the scanning line (sub-scanning), whereby a plurality of scanning lines arranged in the direction of the sub-scanning in parallel to each other are formed. In the image scanning system, the main scanning must be conducted with a constant period and the recording sheet material must be moved in the sub-scanning direction at a constant speed. When the speed at which the recording sheet material is moved in the sub-scanning direction (sub-scanning speed) varies, the density of the scanning lines fluctuates. The fluctuation in the density of the scanning lines results in fluctuation in the density of the image, thereby lowering the quality of the image. This problem is especially significant when processing images having continuous gradation. See, for example, "Various Problems in the Sub Scanning in a Cylindrical Facsimile" ("National Technical Report" Pages 550 to 558, No. 55, vol. 22, October 1976), or "Visibilty and Correction of Periodic Interference Structures in Line-by-Line Recorded Images" ("Journal of Applied Photographic Engineering" Pages 86 to 92, No. 2, vol. 2, April 1976). Further, our experiments have revealed that when the sub-scanning speed fluctuates by 0.1% in recording an image with a density of 10 to 20 lines/mm, the obtained image exhibits visually detectable density fluctuation.

Conventionally, the sub-scanning mechanism for feeding the recording sheet material at a constant speed with a high accuracy comprises a screw rod which is engaged with a nut fixed to a table for carrying a recording sheet material. By rotating the screw rod at a constant speed, the table is fed at a constant speed in the axial direction of the screw rod. This sub-scanning mechanism is disadvantageous in increasing the processing rate since the table must be returned to the original position after the scanning of one sheet material is finished and the image scanning operation must be interrupted while the table is returned. Further, the sub-scanning mechanism is expensive since the screw rod, the nut and a guide rail for guiding the table must be produced with a very high accuracy and since various complicated mechanisms are required for fixing the recording sheet material on the table, discharging the recording sheet material from the table and locating the recording sheet material in a predetermined position on the table. Since such complicated mechanisms are combined, the recording sheet material is apt to be positioned in the wrong position and the sub-scanning mechanism frequently gets jammed with the recording sheet material.

SUMMARY OF THE INVENTION

In view of the foregoing observations and description, the primary object of the present invention is to provide an image scanning system which is inexpensive and able to effect sub-scanning with a high accuracy without jamming of the recording sheet material, and in which the time required for changing the recording sheet material is reduced to the minimum.

In accordance with the present invention there is provided an image scanning system comprising a sub-scanning drum adapted to be continuously rotated to feed a recording sheet material in the sub-scanning direction which is perpendicular to the rotational axis of the sub-scanning drum, a main scanning system for scanning a light beam across the recording sheet material in the direction of the rotational axis of the sub-scanning drum, at least one nip roll movable between a first position in which it is pressed against the sub-scanning drum at a part near the scanning position of the light beam and a second position in which it is removed therefrom, a sheet feeding means for feeding the recording sheet material between the sub-scanning drum and the nip roll with the recording sheet material being nonstrained, a stopper which is disposed downstream the sub-scanning drum and the nip roll with respect to the feeding path of the recording sheet material and is movable into and away from the feeding path, a sheet discharging means for discharging the recording sheet material, and an associating means for associating the nip roll and the stopper with each other, said sheet discharging means being arranged so as not to act on the recording sheet material to cause discharge thereof until the scanning along the recording sheet material is completed.

Said associating means need not move the nip roll and the stopper simultaneously insofar as the nip roll and the stopper move in response to the movement of each other.

Said sheet discharging means may be provided at a position spaced from the nip roll by a distance larger than the length of the recording sheet material so as not to act on the recording sheet material while the recording sheet material is pressed against the sub-scanning drum by the nip roll. Otherwise, the sheet discharging means may be positioned spaced from the nip roll by a distance not larger than the length of the recording sheet material insofar as the scanning of the recording sheet material has been completed by the time the leading end of the recording material is brought into contact with the sheet discharging means.

In the image scanning system of the present invention, the recording sheet material is fed toward the stopper with the nip roll removed from the rotating sub-scanning drum and the stopper positioned in the sheet feeding path. When the leading end of the recording sheet material abuts against the stopper and is positioned in a predetermined position with respect to the sub-scanning drum, the nip roll is pressed against the sub-scanning drum sandwiching the recording sheet material therebetween, whereby the recording sheet material is moved in the sub-scanning direction. The stopper is retracted from the sheet feeding path when the nip roll is pressed against the sub-scanning drum so as not to prevent the feeding of the recording sheet material at a constant speed.

In the image scanning system of the present invention, the sub-scanning drum is continuously rotated and the feeding of the recording sheet material is started when the nip roll is pressed against the drum sandwiching the recording sheet material therebetween. Therefore, fluctuation in the sheet feeding speed cannot occur due to overshooting or ringing at the starting time as frequently occurs in conventional systems in which the sub-scanning mechanism is actuated in response to introduction of the recording sheet material into the sub-scanning mechanism. Further, in the image scanning system of the present invention, the recording sheet material is free from the sheet feeding means when it is supported on the stopper, and is free from the sheet discharging means while the scanning is effected, which also contributes to prevention of fluctuation in the sheet feeding speed. Further, since the sub-scanning drum is continuously rotated, as soon as one recording sheet material is removed from the sub-scanning drum, the next recording sheet can be fed to the sub-scanning drum. Thus, the time required for changing the recording sheet material is reduced to the minimum.

DESCRIPTION OF THE PREFERRED EMBODIMENT

Figure 1:
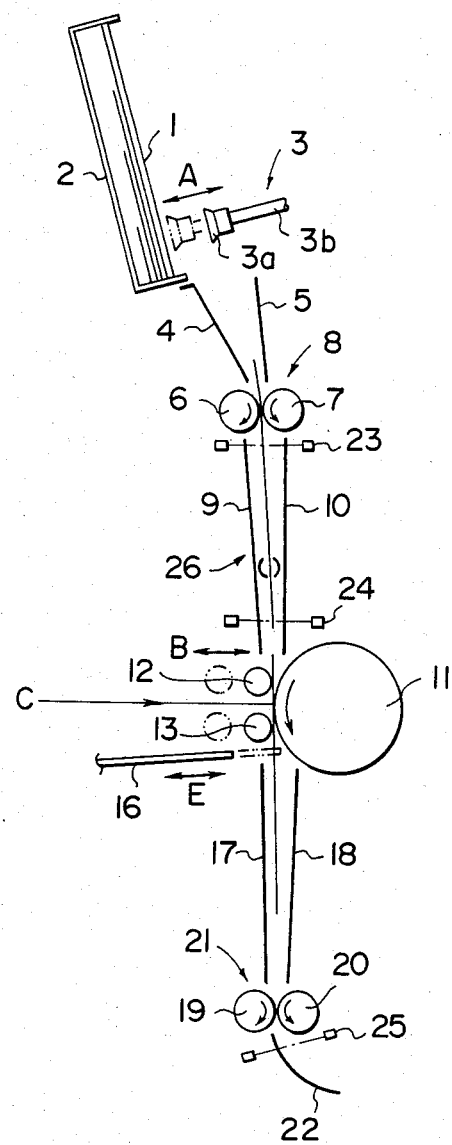
FIG. 1 is a schematic side view of an image scanning system in accordance with an embodiment of the present invention.

FIG. 1 schematically shows an embodiment of the present invention in the form of an image recording system. In this embodiment a recording sheet material 1 having a photosensitive layer is fed along a substantially vertical path. A recording sheet magazine 2 having a closed bottom and an open top is positioned near the top of the system with its open top facing the substantially vertical feeding path of the recording sheet material 1. A plurality of recording sheet materials 1 are stacked in the magazine 2 with the photosensitive side of each recording sheet material directed toward the closed bottom of the magazine 2. A vacuum holder 3 comprising a suction cup 3a and a suction pipe 3b is disposed with the suction cup 3a directed toward the lower part of the open top of the magazine 2. The vacuum holder 3 is mounted movably back and forth in the direction of the arrow A and draws the recording sheet material 1 against the suction cup 3a under the suction force provided through the suction pipe 3b. A pair of guide plates 4 and 5 are disposed below the magazine 2 so that the space therebetween tapers downwardly. A pair of nip rolls 6 and 7 are disposed below the guide plates 4 and 5 with the contact line thereof being opposed to the lower end of the space between the guide plates 4 and 5. The nip rolls 6 and 7 together form a sheet feeding device 8 and are rotated in the directions shown by arrows. A second pair of guide plates 9 and 10 are disposed below the sheet feeding device 8 with their upper ends being opposed to the nip rolls 6 and 7, respectively. The space between the guide plates 9 and 10 has a wide upper end opening upward and a narrow lower end opening downward. A sub-scanning drum 11 is disposed below the pair of guide plates 9 and 10 with one side face thereof being projected under the lower end of the space between the guide plates 9 and 10. The sub-scanning drum 11 is drivingly rotated in the counter-clockwise direction. A pair of nip rolls 12 and 13 are located below the pair of guide plates 9 and 10 opposed to the peripheral surface of the sub-scanning drum 11. The nip rolls 12 and 13 are integrally movable back and forth in the direction of the arrow B to be brought into contact with and removed from the sub-scanning drum 11. The nip rolls 12 and 13 are vertically spaced from each other and a scanning light beam C travels therebetween to impinge upon the recording sheet material 1 on the sub-scanning drum 11.

Figure 2:
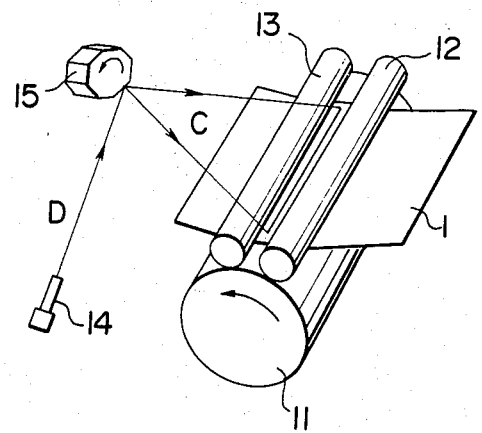
FIG. 2 is an enlarged perspective view of a part of the image scanning system of FIG. 1.
Figure 3:
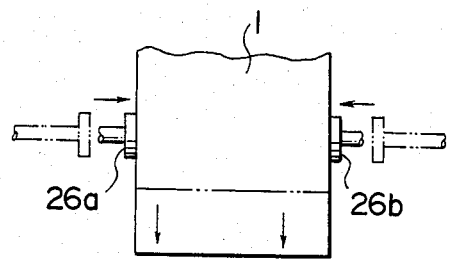
FIG. 3 is a schematic elevational view of a part of the image scanning system of FIG. 1.

FIG. 2 is an enlarged view showing an optical system for projecting the scanning light beam C. As shown in FIG. 2, a light beam D, e.g., a laser beam emitted from a light source 14 is deflected by a deflector 15 to be scanned as the scanning light beam C across the recording sheet material 1 between the nip rolls 12 and 13 in the direction of the axis of the drum 11. The deflector 15 may be a multifaceted mirror or a galvanometer.

Again in FIG. 1, below the lower nip roll 13 is disposed a stopper 16 which is movable back and forth in the direction of the arrow E between an operative position near the sub-scanning drum 11 and a retracted position removed therefrom. Below the stopper 16 are disposed a third pair of guide plates 17 and 18 spaced from each other. The upper end of the space between the guide plates is opposed to the side surface of the drum 11 at which the nip rolls 12 and 13 are brought into contact with the drum 11. Below the guide plates 17 and 18 are diposed another pair of nip rolls 19 and 20 with the contact line thereof opposed to the lower end of the space between the guide plates 17 and 18. The pair of nip rolls 19 and 20 together form a sheet discharge device 21, and are drivingly rotated in the direction shown by arrows. A guide plate 22 is provided below the sheet discharging device 21 for discharging the recorded sheet material 1. Adjacent to the upper and lower ends of the guide plates 9 and 10, are respectively provided sheet detectors 23 and 24, each detector comprising a light emitter and a photodetector, for example. Further, another detector 25 is provided below the sheet discharging device 21. A sheet locating device 26 for locating in the main scanning direction the recording sheet material 1 fed between the guide plates 9 and 10 is provided at an intermediate portion of the guide plates 9 and 10. The sheet locating device 26 comprises a pair of deflecting members 26a and 26b movable toward and away from each other in a direction perpendicular to the sheet material feeding direction. The deflecting members 26a and 26b are positioned widely apart from each other while the leading end portion of the recording sheet material 1 is passed therebetween, and are subsequently moved toward each other to locate the recording sheet material 1 in a direction perpendicular to the sheet feeding direction. The sheet locating device of this type is well known.

Now, the operation of the image scanning system of this embodiment will be described hereinbelow. When recording an image on the recording sheet material 1, the sub-scanning drum 11 is first rotated at a constant speed. Then the vacuum holder 3 is moved leftwardly in FIG. 1 and at the same time a suction force is applied through the suction pipe 3b to draw against the suction cup 3a one of the recording sheet materials 1 stacked in the magazine 2. The suction holder 3 is then moved rightwardly until the recording sheet material 1 on the suction cup 3a is positioned over the upper end of the space between the guide plates 4 and 5. When the vacuum holder 3 is stopped, the application of the suction force is stopped and the recording sheet material 1 falls away from the suction cup 3a falling between the guide plates 4 and 5 onto the nipping portion of the nip rolls 6 and 7. The sheet material 1 is fed between the guide plates 9 and 10. When the recording on the previous recording sheet material is still being continued on the sub-scanning drum 11, the nip rolls 6 and 7 are stopped when the leading end portion of the recording sheet material 1 is detected by the detector 24. When the recording on the previous recording sheet material is completed, the nip rolls 19 and 20 of the sheet discharging device 21 are driven and the nip rolls 12 and 13 are moved away from the sub-scanning drum 11, whereby the recorded sheet material falls onto the nip rolls 19 and 20 passing between the guide plates 17 and 18 and is discharged onto the discharging guide plate 22 by the nip rolls 19 and 20. When the sheet detector 25 detects the leading end portion of the recorded sheet material during the discharging step to confirm that there remains no recording sheet material on the sub-scanning drum 11, said stopper 16 is moved toward the sub-scanning drum 11 to the operative position near the drum 11. At the same time, the nip rolls 6 and 7 of the sheet feeding device 8 are rotated to feed the recording sheet material 1 toward the sub scanning drum 11. The distance between the sheet feeding device 8 and the stopper 16 is selected to be larger than the length of the recording sheet material 1. Accordingly, the recording sheet material 1 falls by gravity onto the stopper 16 in the unstrained state after passing through the nip rolls 6 and 7. When the sheet detector 23 detects that the trailing end of the recording sheet material 1 has passed by the detector 23, said sheet locating device 26 is actuated to locate the recording sheet material 1 in the predetermined position with respect to the axial direction of the drum 11 as described above. Then the nip rolls 12 and 13 are integrally pressed against the sub-scanning drum 11 and the stopper 16 is moved to the retracted position away from the recording sheet material 1. At the same time, the deflecting members 26a and 26b of the sheet locating device 26 are moved away from the recording sheet material 1. Then, the recording sheet material 1 is fed downwardly at the constant speed nipped by the sub-scanning drum 11 which is driven at the constant speed and the idling nip rolls 12 and 13. While the recording sheet material 1 is fed at the constant speed, said scanning light beam C is deflected to be scanned across the recording sheet material 1, whereby a plurality of scanning lines arranged in the sheet feeding direction are formed on the recording sheet material. A desired image is thus recording on the recording sheet material 1.

In the image scanning system of this embodiment, the recording sheet material 1 is completely removed from the sheet feeding device 8 and the sheet discharging device 21 when it is fed nipped by the sub-scanning drum 11 and the nip rolls 12 and 13. Accordingly, the sub-scanning speed cannot be affected by the sheet feeding device 8 or the sheet discharging device 21. The constant speed feeding of the recording sheet material 1 or the sub-scanning is started at the moment the nip rolls 12 and 13 are pressed against the sub-scanning drum 11 which is continuously rotated at the constant speed without being stopped or rotated in the opposite direction for discharging the recorded sheet material or for preparing the next recording sheet material. Therefore, fluctuation in the sheet feeding speed due to overshooting or ringing at the starting time cannot occur, whereby stabilized feeding accuracy can be obtained. Further, since the sub-scanning drum 11 for feeding the recording sheet material at the constant speed is continuously rotated, it is not necessary to adjust the position of the drum 11 when the sheet material 1 is fed thereto and therefore it is possible to continuously feed the recording sheet materials to the recording section. Further, since the recording sheet material 1 is fed to the sub-scanning drum 11 and is discharged therefrom by permitting the recording sheet material 1 to fall under its own weight, the image scanning system does not jam even if two or more recording sheet materials are simultaneously fed by the sheet feeding device 8.

Furthermore, when the recording sheet material 1 is located with respect to the sub-scanning drum 11 in the axial direction thereof by the sheet locating means, the recording sheet material 1 is removed from the sheet feeding device 8. Therefore, the recording material 1 can be located in the correct position even if the recording sheet material 1 passes through the sheet feeding device 8 in an inclined state, whereby the structure of the sheet locating device 8 can be simplified.

In the above embodiment, when one recording sheet material is on the sub-scanning drum 11, the next recording sheet material is fed until the leading end portion thereof is detected by the detector 24 and held there until the previous sheet material is discharged from the sub-scanning drum 11. However the next sheet material may be held with its leading end abutting against the sheet feeding nip rolls 6 and 7 which are stopped when the previous sheet material is on the sub-scanning drum 11. In this case the detector 24 can be omitted. Whether or not the previous sheet material is on the sub-scanning drum 11 can be detected by detecting the position of the nip rolls 12 and 13, for example. Although, a pair of nip rolls 12 and 13 are used for pressing the recording sheet material 1 against the sub-scanning drum 11 in the above embodiment, a single nip roll may be used in case that the sub-scanning drum is a vacuum suction type one.

Although, in the above embodiment, the sheet feeding path is arranged to vertically extend and the recording sheet material 1 is fed to the sub-scanning drum 11 and discharged therefrom by allowing it to fall under its own weight, it is possible to arrange the sheet feeding path to extend horizontally and to feed the recording sheet material 1 to the sub-scanning drum 11 by the inertia force of the sheet material 1 imparted thereto by the sheet feeding device. However, the arrangement of the above embodiment is preferred in that it is free from the problem of jamming as described above.

Said sheet locating device 26 can be omitted if the sheet feeding device 8 is arranged to locate the recording sheet material 1 with respect to the sub-scanning drum 11 in the axial direction thereof. However, this adds to the manufacturing cost of the system.

Although, in the above embodiment the image scanning system is used for recording an image on the recording sheet material, the image scanning system of the present invention may be used for reading a recorded image.

I claim:

1. An image scanning system for two-dimensionally scanning a light beam across a recording sheet material comprising a sub-scanning drum adapted to be continuously rotated to feed the recording sheet material in the sub-scanning direction which is perpendicular to the rotational axis of the sub-scanning drum, a main scanning system for scanning the light beam across the recording sheet material in the direction of the rotational axis of the sub-scanning drum, at least one nip roll movable between a first position in which it is pressed against the sub-scanning drum at a part near the scanning position of the light beam and a second position in which it is removed therefrom, a sheet feeding means for feeding the recording sheet material between the sub-scanning drum and the nip roll with the recording sheet material being unrestrained, a stopper which is disposed downstream of the sub-scanning drum and the nip roll with respect to the feeding path of the recording sheet material and is movable into and away from the feeding path, a sheet discharging means for discharging the recording sheet material, said sheet discharging means being arranged so as not to act on the recording sheet material to be discharged until the scanning of the recording sheet material is completed whereby when said stopper is moved into said feeding path, the said unrestrained feeding of the recording sheet material between the sub-scanning drum and the nip roll occurs until the recording sheet material is stopped by the stopper, at which time, the stopper is removed away from the feeding path and the nip roll is moved to its first position pressed against the sub-scanning drum to feed the recording sheet material in the sub-scanning direction to thereby effect the two-dimensional scanning of the light beam across the recording sheet material as the sub-scanning drum is continuously rotated.

2. An image scanning system as defined in claim 1 in which said sheet feeding means comprises feeding rolls spaced from said stopper by a distance larger than the length of the recording sheet material, and said sheet discharging means comprises feeding rolls.

3. An image scanning system as defined in claim 2 in which the recording sheet material is fed from the sheet feeding means to the sub-scanning drum by being permitted to fall under its own weight.

4. An image scanning system as defined in claim 3 in which said recording sheet material is fed from the sub-scanning drum to the sheet discharging means after the scanning is completed by being permitted to fall under its own weight.

* * * * *